United States Patent [19]
Dykstra

[11] 3,773,361
[45] Nov. 20, 1973

[54] TWINE CUTTING DEVICE FOR BALER
[76] Inventor: Dan Dykstra, Trosky, Minn.
[22] Filed: May 10, 1972
[21] Appl. No.: 252,019

[52] U.S. Cl. ................................................. 289/14
[51] Int. Cl. ............................................ B65h 69/04
[58] Field of Search ............................ 289/2, 10, 14

[56] References Cited
UNITED STATES PATENTS
407,734  7/1889  Kunkle................................. 289/14
3,492,035  1/1970  Bornzin et al. ....................... 289/14
3,508,776  4/1970  Grillot................................... 289/14

Primary Examiner—Louis K. Rimrodt
Attorney—Lucas J. De Koster

[57]  ABSTRACT

A twine cutting device for a baling machine including specifically a moving anvil pressed against the twine cutting knife by a cam operated lever operated from the twine tying mechanism.

4 Claims, 2 Drawing Figures

PATENTED NOV 20 1973  3,773,361

TWINE CUTTING DEVICE FOR BALER

BACKGROUND AND SUMMARY OF THE INVENTION

Nearly all hay baling machines presently in use on moderate or smaller sized farms now use twine as the medium to hold the bale of hay together after it has been picked up and compressed into shape. The twine is wrapped around the bale mechanically and then is also tied and cut by the baling mechanism.

Most cutters for the twine are relatively simple knives held in the tying mechanism in a location where the twine is moved against the knife and is cut upon impact. However, when the knife becomes somewhat dulled, the impact frequently is insufficient to make a good cut, and the twine either frays badly, or sometimes is not cut at all.

By my invention, I provide a cutter which operates positively to press the twine against the knife to assure a reasonable good cut for a far longer time between replacements of the knife.

FIGURES

Figure 1:
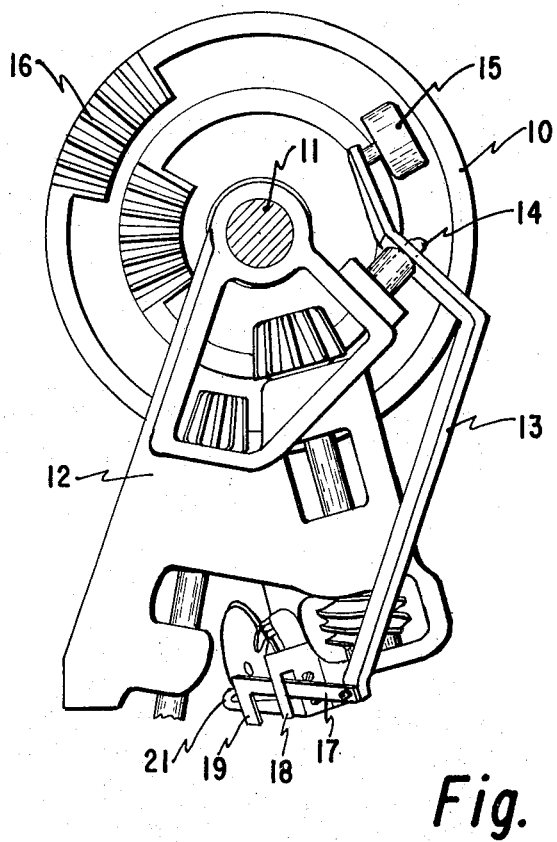
Figure 2:
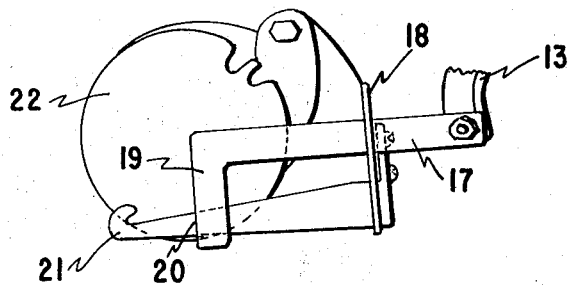

FIG. 1 is an elevational view showing the gear drive and the device of my invention separated from the rest of the baler, FIG. 2 is a detailed view to an enlarged scale showing the anvil of my device in relation to the knife.

DESCRIPTION

Briefly my device comprises a movable anvil adapted to press the twine in a baler against the cutting knife to assure a good cutting of the twine. The anvil is moved by a lever and cam-follower arrangement from the tying mechanism of the baler.

More specifically and referring to the drawings, I have shown the mutilated ring gear 10 which operates the tying mechanism. This gear is driven through a shaft 11 on which it is mounted. A framework 12 supports the tying mechanism, and provides a base on which my device is mounted.

My device includes a lever arm 13 pivotally mounted on the frame at 14. At one end of the lever I provide a roller type follower 15 formed from a fiber material and rotatably mounted on the lever. This follower is ordinarily not in engagement with the ring gear, but is positioned so that when the gear teeth 16 come around, it is engaged by the teeth. The teeth, being substantially raised above the surface of the gear, act as a cam to push the follower 15 away from the face of the gear.

At the end of the lever 13 opposite the follower, an L-shaped piece 17 is pivotally attached. This piece 17 is slidably guided by a guide plate 18 mounted to the frame 12. The shorter leg 19 of the L-shaped piece 17 includes an anvil face 20 adapted to be pressed against or to be moved past the knife 21 to either cut or shear the twine which is moved against the knife by the tying mechanism 22.

The lever 13 is proportioned so that the amount of motion imparted to the follower 15 is magnified enough to carry the anvil face 20 to its proper cutting position. Also, the roller follower 15 must be properly located to provide proper timing of the movement. Both of these properties of proportion and location are well within the ability of a mechanic skilled in the art and may vary from one machine to another so that no specific proportions are given here. It is only noted that these requirements must be met for satisfactory operation.

I claim:

1. A twine cutting device for a baling machine having a knot tying mechanism and a twine cutting knife adjacent said tying mechanism, said cutting device comprising a moving anvil movably mounted in said machine adjacent said knife, and operating means operably connected to said anvil and engaged with said tying mechanism whereby said anvil carries the twine into forcible engagement with said knife to cut the twine.

2. The device of claim 1 in which said tying mechanism includes a mutilated gear and said operating means includes a roller follower, said follower being engaged with the whole teeth of said gear but disengaged from the mutilated part of the gear as said gear turns, said roller when engaged with the teeth being adapted to cause said operating means to carry the anvil to the cutting position.

3. The device of claim 1 in which said tying mechanism includes a mutilated gear and said operating means includes a roller means adjacent said gear, said gear acting as a cam and said roller means as a follower whereby said operating means is caused to operate to cut the twine.

4. The device of claim 1 in which said tying mechanism includes cam means, said operating means including follower means engaging said cam means and linkage means carrying said follower means and attached to said knot tying mechanism, said linkage means being proportioned to enlarge the motion of said follower means to carry said anvil to its cutting position.

* * * * *